Sept. 13, 1960 G. R. COBB ET AL 2,952,749

TELEPHONE STERILIZER

Filed Jan. 11, 1957 2 Sheets-Sheet 1

INVENTOR.
George R. Cobb
Peter H. Schroeder
BY Barnes & Seed
Attorneys

Sept. 13, 1960 G. R. COBB ET AL 2,952,749

TELEPHONE STERILIZER

Filed Jan. 11, 1957 2 Sheets-Sheet 2

INVENTORS
George R. Cobb
Peter H. Schroeder
BY Barnes & Seed
Attorneys

United States Patent Office 2,952,749

Patented Sept. 13, 1960

2,952,749

TELEPHONE STERILIZER

George R. Cobb and Peter H. Schroeder, both of Vancouver, British Columbia, Canada, assignors, by mesne assignments, to Danley-Gordon, Denver, Colo.

Filed Jan. 11, 1957, Ser. No. 633,632

4 Claims. (Cl. 179—185)

This invention relates to a sterilizer for the mouth-piece of telephones, and particularly a desk or French type of telephone. As its general object the invention aims to provide a perfected device for this purpose which utilizes, as the sterilizing agent, rays and ozonic gases originating from an ultra violet or other like or suitable lamp. The invention is one in which the lamp is contained in a normally open electric circuit completed by a switch closed automatically in response to the physical act of placing the hand-piece upon the telephone base, and it is a particular object to devise a sterilizer in which the lamp is de-energized automatically upon the expiration a given time interval following each act of completing a circuit.

As a further particular object the invention aims to provide a sterilizer of the described nature characterized in that the same is wholly contained within the telephone base, and which is or may be installed without in any way altering the parts normally housed within the telephone base or changing the location thereof.

With the above objects and advantages in view and further aiming to provide a telephone sterilizer of simple and inexpensive construction, which can be operated at a modicum of expense, which is foolproof in operation and unusually durable in use, all of which will appear and be understood in the course of the following description and claims, the invention consists in the novel construction and in the adaptation and combination of parts hereinafter described and claimed.

Figure 1:
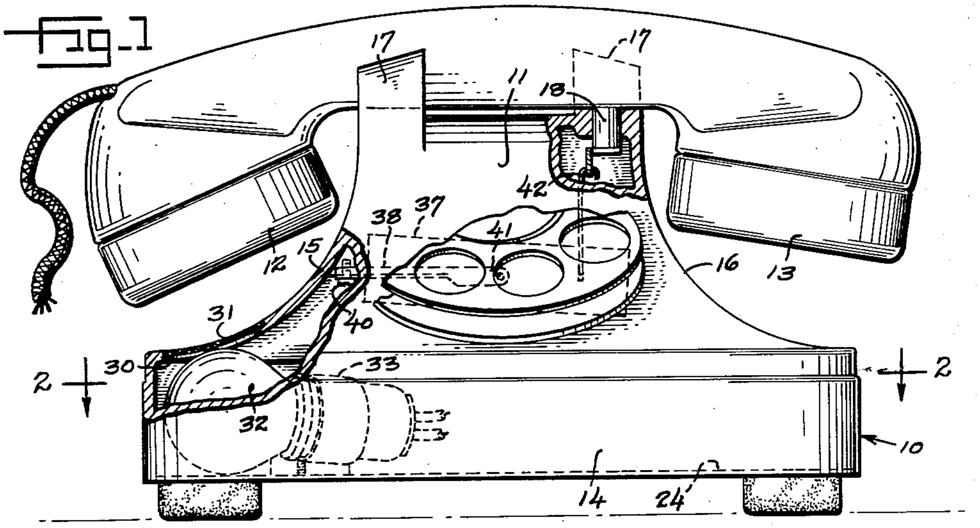
Figure 1 is a front elevational view with parts broken away and shown in section illustrating a French type telephone containing, within the base part thereof, a sterilizing system constructed to embody the preferred teachings of the present invention.
Figure 2:
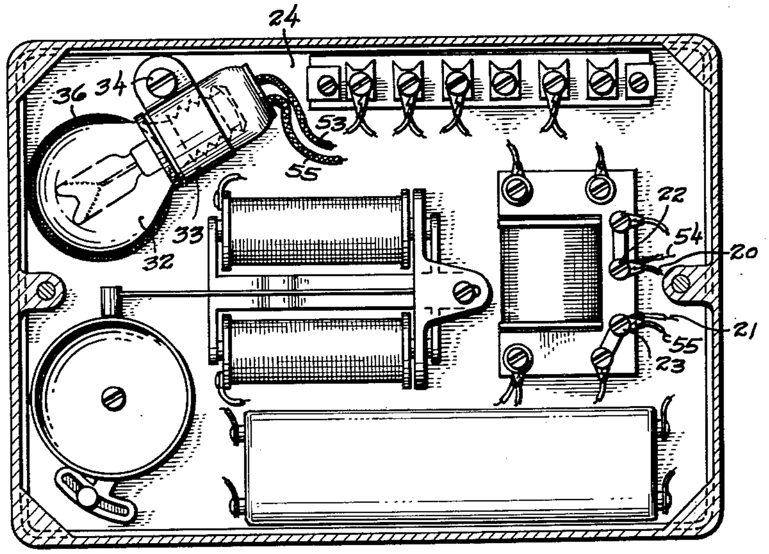
Fig. 2 is a horizontal sectional view on line 2—2 of Fig. 1, with wire leads shown fragmentarily.

A French type telephone of typical form and construction is illustrated in Figs. 1 and 2, having a base designated by the numeral 10 wherein is contained the operating mechanism required for sending and receiving spoken messages. Considered as to form, the shape usual to the base of a French type telephone is one which flares in a very substantial degree from a head 11, moderately narrower in compass than the span between the mouth-piece 12 and the receiver 13 of a complementing hand-set, to a fairly wide bottom 14. The flanking cheeks 15 and 16 are rather deeply dished, wherefore the slope of said cheeks along the lower portion thereof approaches the horizontal, and these relatively flat portions closely underlie the mouth-piece or the receiver, as the case may be, when the hand-set occupies the normal position in which it is shown in Fig. 1, namely a position resting upon the head between confining pairs of upstanding horns 17. No need arises to more than cursorily consider the 'phone mechanism housed within the base 10, and suffice it to here say that the act of placing the hand-set upon the base depresses two buttons 18 against the yielding upward thrust imposed by a spring. There is provided an operative interconnection from these buttons to a switch responsible for completing the telephone circuit. Neither the spring, the switch, nor the operative interconnection are illustrated but the arrangement is one in which the switch is closed if either or both of the buttons are depressed. Electric current is supplied by two line wires 20 and 21 which connect, within the base, to binding posts 22 and 23.

According to the present invention there is provided a centered opening 30 in the flat lower portion of the cheek 15, this being the cheek portion which underlies the mouth-piece 12. Such opening is or may be screened by sheer nylon or other like cloth 31. Directly below this opening, within the telephone's cradle base 10, there is mounted a sterilizing lamp 32. As here shown the mount therefor comprises a clamping band 33 encircling the lamp butt and secured, as by a screw 34, to the removable floor wall 24 of the base. A screened bottom opening 36 is provided in this floor wall.

Complementing the lamp and also contained within the cradle base is a switch interconnected with one or both of the two buttons 18, and the operating characteristics of the switch are such, by preference, as sequentially causes the lamp to be (1) energized automatically in response to a depression of the button as the hand-set is placed upon the cradle, (2) de-energized upon the expiration of a given time interval, and (3) re-set automatically by a lifting of the hand-set for responsively conditioning the switch to again energize the lamp when the hand-set is replaced upon the head. A suitable switch having these operating characteristics is the mercury switch detailed in Figs. 3 through 8. This switch is comprised of a relatively elongated body 37, and the mounting therefor comprises a bracket 38 screwed, as at 40, to the telephone base and at its free end presenting a pin 41 on which the switch body is pivoted for rocker motion about a transverse horizontal axis. For purposes of balance this pivot pin lies at or about the mid-length of the body. Connection to the switch body from one of the two buttons 18 comprises a vertical arm 42.

Reverting now to the details of the switch, it will be seen that there is a relatively long rectilineal main passage 43 running longitudinally of the body on a level which traverses the horizontal as the body rocks from one to the other extreme of its permitted pivot motion. Adjacent each end of the body a respective passage, as 44 and 45, rises vertically from the ends of said main passage, and connecting the head ends of these riser passages is an upper longitudinal passage 46. Said system of passages is sealed from the atmosphere.

Within the length of the riser passage 44 there is provided an upwardly facing shoulder 47, and seating by force of gravity upon this shoulder to function as a check valve is a ball 48. As can be seen from an inspection of Fig. 8, the surface of this seat is scored by a groove 50 of such minute air-flow capacity as will permit only a slow bleeding past the ball.

Denoted by 51 and 52 are two electrically conductive posts piercing the bottom wall of the switch body in longitudinally spaced relation. Placed more or less midway between the ends of the main passage 43, the upper ends of said posts are exposed to the interior of the passage, and presented at their lower ends are binding terminals one of which connects by a lead wire 53 with one side of the lamp 32 and the other of which connects by a lead wire 54 to one of the two binding posts 22 and 23. The wiring is completed by another lead wire 55 running from the other binding post to the other side of the lamp.

Within the main passage 43 there is contained a slug 56 of mercury which, in measure, approximates, say, a third or less of the volumetric capacity of the passage, and completely filling the remaining space of the system of passages is an inert gas of any desired nature.

Figures 3, 4, 5:
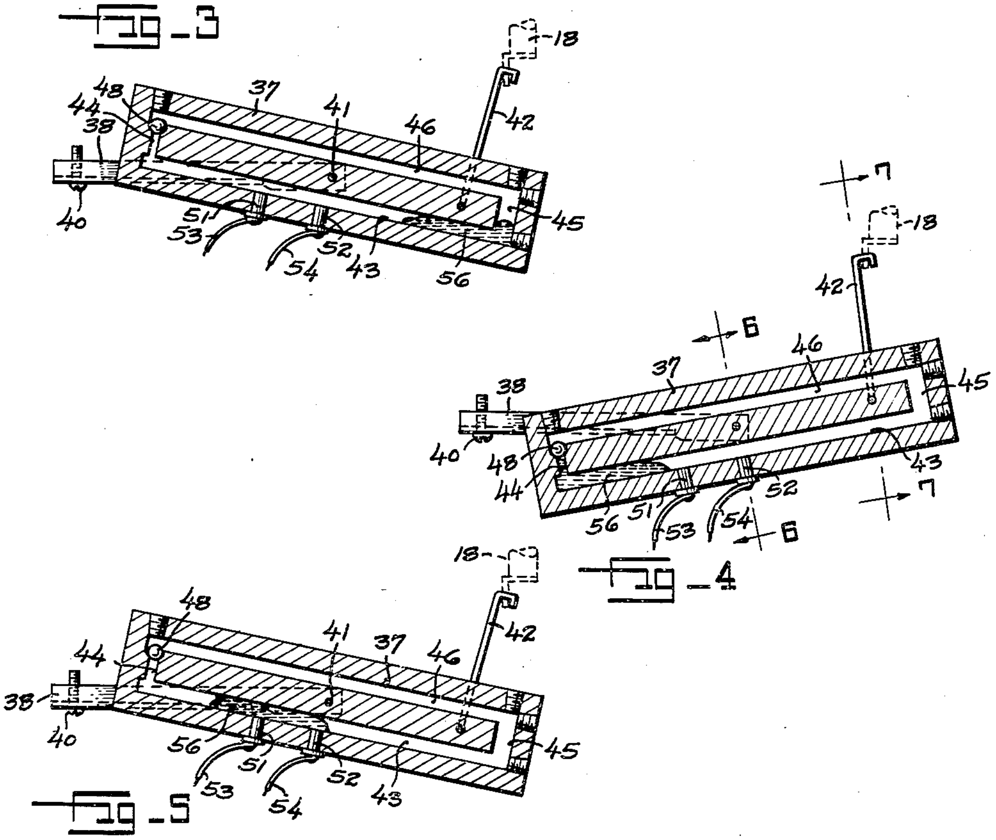
Fig. 3 is a large-scale longitudinal vertical sectional view of a mercury switch suitable for use in the present invention, the switch being shown by dotted lines in Fig. 1.
Fig. 4 is a longitudinal vertical sectional view of the switch, showing the same occupying the position in which it is tilted by the act of lifting the hand-piece off the telephone base.
Fig. 5 is a view similar to Fig. 3, and namely with the switch again tilted to the position which the same normally occupies, but with the body of mercury here shown in a circuit-closing position to signify interim action taking place during a time interval of given duration following the operation of replacing the hand-piece upon the base of the telephone.
Figure 6:
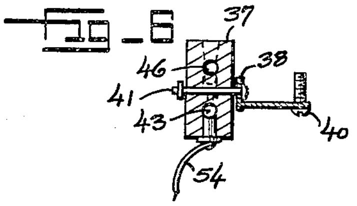
Fig. 6 is a transverse vertical sectional view on line 6—6 of Fig. 4.
Figure 7:
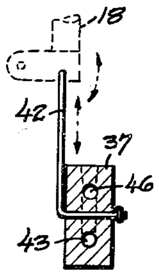
Fig. 7 is a transverse vertical sectional view on line 7—7 of Fig. 4.
Figure 8:
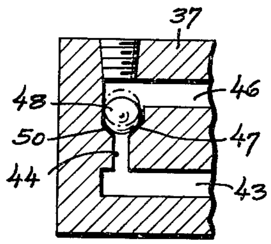
Fig. 8 is a large scale fragmentary view of a ball check valve embodied in the switch, the view being portrayed without shading in order to detail a minute bleed passage traversing the seat for such valve.

While pointing out that the tilt to which the switch is subjected is somewhat exaggerated in the drawings in order to more clearly illustrate the shifting movement of the mercury slug, the operation of the present sterilizing device can be described as follows:

Let it be assumed that the hand-set has been lifted off the telephone base. The spring load to which the buttons 18 are subjected causes such buttons to instantly rise. This freeing of the spring-pressed buttons acts through the connecting arm 42 to responsively move the switch body so that the latter is tilted in a rearward direction, namely from the position in which it is shown in Fig. 3 into the position shown in Fig. 4. The slug of mercury, having occupied a location at the depressed front end of the main passage, rushes freely toward the now lower rear end. Displaced inert gas lying to the front of the advancing mercury slug lifts the ball check off its seat, permitting such displaced gas to move freely through riser passage 44 from the lower to the upper passage. Upon replacing the handset upon the base, the resulting depression of the buttons 18 acts through the connecting arm 42 to again rock the switch body, now tilting the same forwardly into the position in which it is shown in Fig. 5. There now ensues a very gradual downhill motion of the mercury, retarded by head suction with alleviating "seepage" past the ball as inert gas bleeds from above into the passage below. In course of this downhill motion, and made to occur almost instantly following the forward tilting of the switch, the slug of mercury bridges the two posts 51 and 52 and completes a circuit through the lamp, such circuit remaining closed during the time interval necessary for the mercury to clear the back post. As the mercury reaches the lower limit of the main passage 43, to occupy the position shown in Fig. 3, a cycle of operation is completed.

It is thought that the invention and its advantages will have been clearly understood from the foregoing detailed description of the now-preferred illustrated embodiment. Minor changes in the details of construction can self-evidently be resorted to without departing from the spirit of the invention and it is therefore our intention that no limitations be implied and that the hereto annexed claims be given the broadest interpretation to which the employed language fairly admits.

We claim:

1. A telephone sterilizer comprising, in combination with the base and the hand-set of a cradle-type telephone, said base having an upwardly facing opening underlying the mouthpiece of the hand-set when the latter is cradled upon the base, a sterilizing lamp housed in said base in a position such that rays of the lamp pass through said opening into said mouthpiece, a normally incomplete electric circuit for said lamp drawing current from the binding posts of the telephone base which receive line current for the operation of the telephone, a switch for completing said circuit closed automatically in response to a cradling of the hand-set upon the base, and time-delay means associated with said switch for opening said switch automatically upon the expiration of a given time interval, said switch being also housed within the base.

2. A telephone sterilizer comprising, in combination with the base and the hand-set of a cradle-type telephone, said base having an upwardly facing opening underlying the mouthpiece of the hand-set when the latter is cradled upon the base, a sterilizing lamp housed in said base in a position such that rays of the lamp pass through said opening into said mouthpiece, a normally incomplete electric circuit for said lamp drawing current from the binding posts of the telephone base which receive line current for the operation of the telephone, a mercury switch for completing said circuit closed automatically in response to a cradling of the hand-set upon the base, and time-delay means associated with said switch for opening said switch automatically upon the expiration of a given time interval, said switch being also housed within the base.

3. A telephone sterilizer comprising, in combination with the base and the hand-set of a cradle-type telephone: a sterilizing lamp supported by said base in such a position as will focus rays from the lamp into the mouthpiece when the mouthpiece is cradled upon the base, a normally incomplete electric circuit for said lamp, a switch for completing said circuit characterized in that the same is closed automaticlly in response to a cradling of the hand-set upon the base, and time-delay means for opening said switch automatically upon the expiration of a given time interval.

4. A telephone sterlizer comprising, in combination with the base and the hand-set of a cradle-type telephone: a sterilizing lamp supported by said base in such a position as will focus rays from the lamp into the mouthpiece when the mouthpiece is cradled upon the base, a normally incomplete electric circuit for said lamp, a mercury switch for completing said circuit characterized in that the same is closed automatically in response to a cradling of the hand-set upon the base, and time-delay means for opening said switch automatically upon the expiration of a given time interval.

References Cited in the file of this patent

UNITED STATES PATENTS

| | | |
|---|---|---|
| 2,165,546 | Heller | July 11, 1939 |
| 2,316,540 | Danley | Apr. 13, 1943 |
| 2,495,034 | Sullivan | Jan. 17, 1950 |
| 2,697,173 | Balakofsky | Dec. 14, 1954 |
| 2,763,735 | Wahl | Sept. 18, 1956 |